(12) United States Patent
Wootten

(10) Patent No.: US 8,646,327 B2
(45) Date of Patent: Feb. 11, 2014

(54) FLUID FLOW SENSOR

(75) Inventor: Keith Robert Wootten, Reading (GB)

(73) Assignee: Sondex Wireline Limited, Hook, Hampshire (GB)

( * ) Notice: Subject to any disclaimer, the term of this patent is extended or adjusted under 35 U.S.C. 154(b) by 387 days.

(21) Appl. No.: 13/183,751

(22) Filed: Jul. 15, 2011

(65) Prior Publication Data

US 2012/0011928 A1    Jan. 19, 2012

(30) Foreign Application Priority Data

Jul. 16, 2010    (GB) .................................. 1011973.3

(51) Int. Cl.
*E21B 47/10*    (2012.01)
*G01F 1/05*    (2006.01)

(52) U.S. Cl.
USPC ..................................... 73/152.35; 73/861.79

(58) Field of Classification Search
USPC ............... 73/152.21, 152.29, 152.34, 152.35, 73/861.78, 861.79
See application file for complete search history.

(56) References Cited

U.S. PATENT DOCUMENTS

| | | | |
|---|---|---|---|
| 3,162,042 A | | 12/1964 | Hart |
| 3,826,134 A | * | 7/1974 | Miller ........................ 73/152.35 |
| RE28,464 E | * | 7/1975 | Bonnet ....................... 73/152.35 |
| 3,911,743 A | * | 10/1975 | Nicolas et al. ............. 73/861.92 |
| 4,248,082 A | * | 2/1981 | Farmer ....................... 73/861.85 |
| 4,265,127 A | * | 5/1981 | Onoda ........................ 73/861.78 |
| 4,441,361 A | * | 4/1984 | Carlson et al. ............. 73/152.31 |
| 5,063,775 A | * | 11/1991 | Walker et al. .............. 73/152.31 |
| 5,216,924 A | | 6/1993 | Le Breton |
| 6,176,129 B1 | * | 1/2001 | Aguesse et al. ............ 73/152.31 |
| 7,111,520 B2 | * | 9/2006 | Payne et al. ................ 73/861.79 |
| 7,114,386 B1 | | 10/2006 | Veignat et al. |
| 7,603,915 B2 | * | 10/2009 | Spivak et al. ............ 73/861.352 |
| 8,205,509 B2 | * | 6/2012 | Oddie ........................ 73/861.75 |
| 2003/0066361 A1 | * | 4/2003 | Kim et al. .................. 73/861.79 |
| 2005/0039546 A1 | * | 2/2005 | Payne et al. ................ 73/861.79 |
| 2005/0229718 A1 | | 10/2005 | Cens et al. |
| 2005/0235761 A1 | | 10/2005 | Faur et al. |
| 2012/0158308 A1 | * | 6/2012 | Wootten .......................... 702/12 |

FOREIGN PATENT DOCUMENTS

| | | | | | |
|---|---|---|---|---|---|
| GB | 2102129 | A | * | 1/1983 | ............... G01F 1/05 |
| GB | 2135060 | A | | 8/1984 | |
| JP | 55135711 | A | * | 10/1980 | .............. G01F 1/075 |

OTHER PUBLICATIONS

British Search Report, dated Nov. 18, 2010, for British Application GB1011973.3 filed on Jul. 16, 2010.

* cited by examiner

*Primary Examiner* — John Fitzgerald
(74) *Attorney, Agent, or Firm* — Global Patent Operation

(57) ABSTRACT

A bi-directional fluid flow sensor is disclosed. The sensor comprises a turbine configured to rotate along an axis as a result of fluid flowing past the turbine substantially in the direction of the axis; a magnet mounted to the turbine and configured to rotate with the turbine; and a magnetic flux angle sensor provided adjacent to the turbine and configured to detect the relative flux angle of the magnet as it rotates. The bi-directional fluid flow sensor is sensitive and robust and may be used in a downhole well for example.

14 Claims, 5 Drawing Sheets

FLUID FLOW SENSOR

BACKGROUND OF THE INVENTION

Embodiments of the present invention relate to a fluid flow sensor, which may for example be provided on a downhole tool such as an array flow meter tool.

It is desirable to understand the fluid flow regime in a downhole well which typically includes oil, water and gas. In particular, non-vertical wells may have gases flowing in one direction such as upwards and liquids flowing in another direction, such as downwards, often with differing flow rates.

An example of a fluid flow sensor uses three magnets spaced axially along a long helical rotating turbine or so-called "spinner" which is difficult to rotatably balance. In addition, the sensors used may not be very sensitive and may require strong magnets and/or small clearances between the turbine and the surrounding housing. The magnets also have a tendency to attract magnetic debris causing fouling of the miniature turbine.

It would be desirable to have a fluid flow sensor which overcomes or at least alleviates at least some of the problems of known sensors.

BRIEF SUMMARY OF THE INVENTION

Embodiments of the present invention provide a bi-directional fluid flow sensor, the sensor comprising a turbine configured to rotate along an axis as a result of fluid flowing past the turbine; a magnet mounted to the turbine and configured to rotate with the turbine; and a magnetic flux angle sensor provided adjacent to the turbine and configured to detect the relative flux angle of the magnet as it rotates.

In embodiments of the present invention, the turbine is easier to balance such that the flow sensor may be more sensitive to low fluid flows and simpler to manufacture, saving time and costs. Furthermore, as the magnetic flux angle sensor may be more sensitive than conventional magnetic sensors, such as Hall Effect sensors, a larger clearance may be provided between the turbine and the magnetic flux angle sensor reducing the likelihood of fouling of the turbine.

The magnet or magnets are preferably provided symmetrically through the rotatable axis of the turbine. This maintains the rotatable balance of the turbine along its axis and may assist the securing of the turbine to a shaft along its rotatable axis. The polar axis of the magnet is preferably perpendicular to the rotatable axis of the turbine.

The fluid flow sensor preferably comprises an electrical connection, such as a wire, which may be used to provide electrical power to the sensor and also to provide a digital output from the sensor. This provides simpler connections which are more robust and reliable.

An array flow meter tool for a downhole well may also be provided, with the tool comprising a plurality of resilient outwardly extending bow springs each provided with a fluid flow sensor in accordance with an embodiment of the present invention.

BRIEF DESCRIPTION OF THE SEVERAL VIEWS OF THE DRAWINGS

Various embodiments of the present invention will now be described, by way of example only, with reference to the accompanying drawings in which.

DETAILED DESCRIPTION OF THE INVENTION

Figure 1:
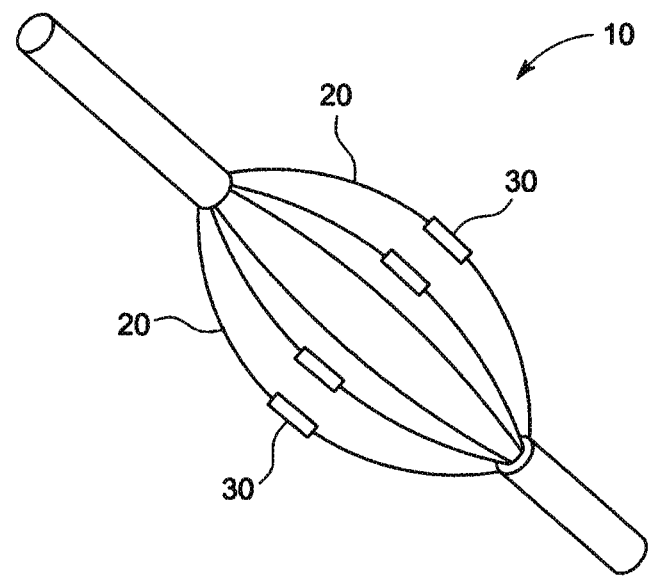
FIG. 1 shows an array flow meter tool incorporating fluid flow sensors in accordance with an embodiment of the present invention.

FIG. 1 shows an example of an array flow meter tool 10 which may be provided in a downhole well for example. The tool 10 has a number of bow springs 20 attached at each end to the tool 10. The bow springs 20 are resilient and arranged to extend radially outwards and into contact with an inside surface of a downhole well for example when in use. Each bow spring 20 is provided with a fluid flow sensor 30 arranged to detect the flow of fluid past that point. A plurality of fluid flow sensors 30 is provided circumferentially around the tool 10 in order to be able to measure flow at different points at that location in the downhole well. This is because the fluid in the well may be flowing at different rates at different parts of the well and indeed may even be flowing in different directions, for example in a non-vertical well, gas may be flowing in an upward direction on an upper side and liquids may be flowing in a downward direction on the opposite side.

Figure 2:
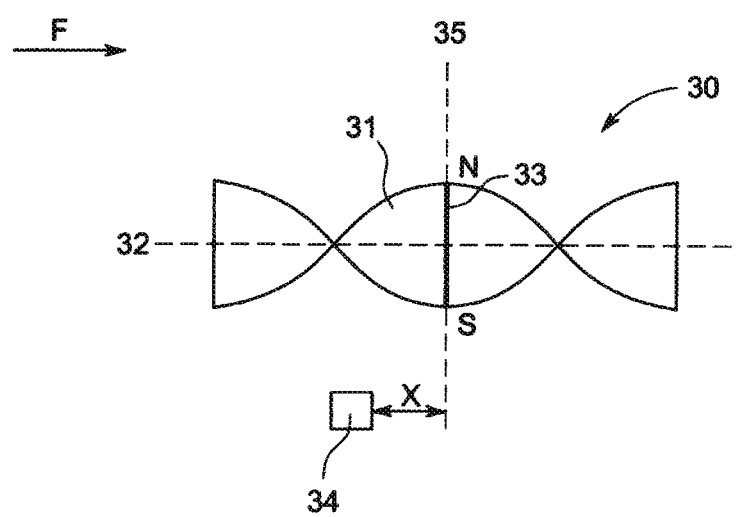
FIG. 2 schematically shows a fluid flow sensor in accordance with an embodiment of the present invention.

FIG. 2 schematically shows an example of the fluid flow sensor 30. The fluid flow sensor has a turbine 31 or so-called "spinner" arranged to rotate along an axis 32 as a result of fluid F flowing past the turbine 31, typically substantially in the direction of the axis 32. A magnet 33 or magnets is mounted to the turbine 31 and arranged to rotate with the turbine 31. A magnetic flux angle sensor 34 is provided adjacent to the turbine 31 and arranged to detect the relative flux angle of the magnet 33 as it rotates. The magnetic flux angle sensor 34 is mounted in a fixed position, preferably in a housing, offset a distance x from the plane of rotation 35 of the magnet 33.

Figure 3:
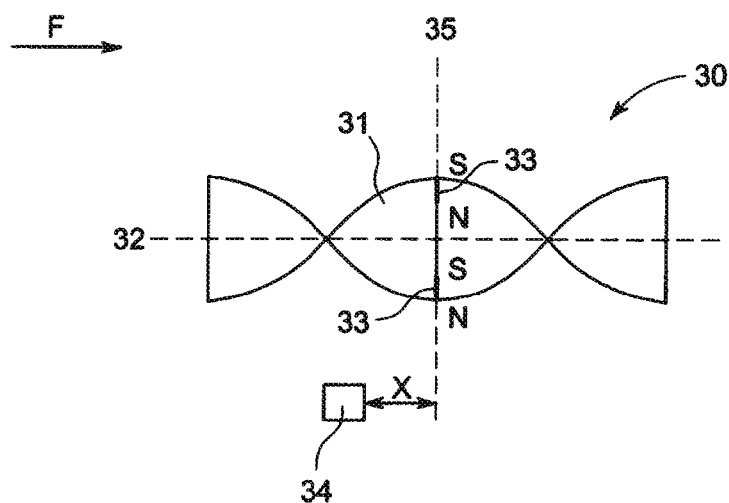
FIG. 3 schematically shows a fluid flow sensor in accordance with another embodiment of the present invention.

Although only one magnet 33 is shown in the example of FIG. 2, two or more magnets may be provided to further increase the resolution of the sensor 30. For example, two magnets may be provided in the plane of rotation 35 as shown in FIG. 3, each mounted on the edge of the turbine 31 on opposite sides and with opposite poles (north and south) facing out from the edge of the turbine. Alternatively more magnets may be equiangularly arranged around the edge of the turbine 31 in the plane of rotation 35, with alternating poles facing outwards.

Figure 4:
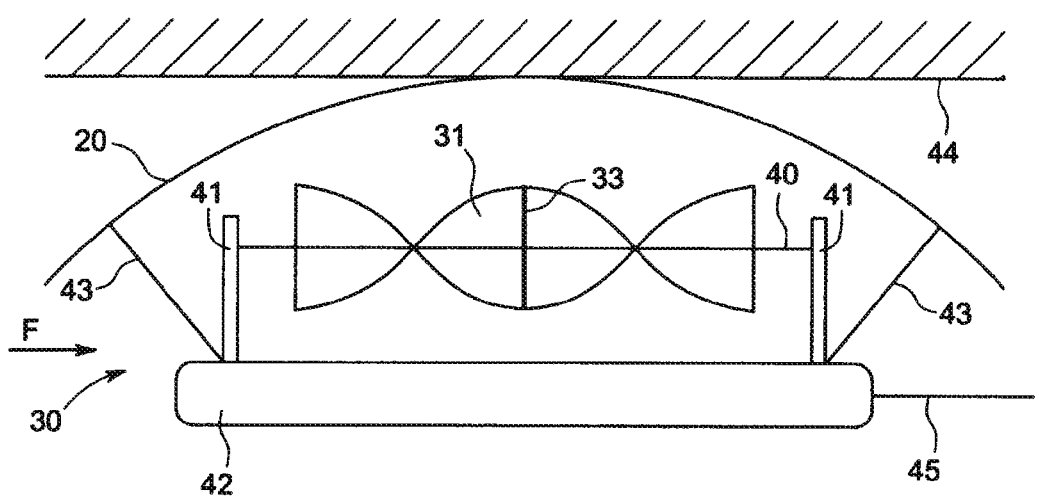
FIG. 4 shows a more detailed example of the fluid flow sensor in accordance with an embodiment of the present invention.

FIG. 4 provides a more detailed example of the fluid flow sensor 30 shown in FIG. 2. In this example, the turbine 31 is mounted to a rotatable shaft 40 along its axis 32. The shaft 40 is mounted at each end to a mount 41. The mounts 41 are provided on a housing 42 which accommodates the magnetic flux angle sensor 34 and signal processing electronics. The fluid flow sensor 30 is attached to a bow spring 20 in any appropriate way as known by a person skilled in the art, in this example by supports 43. As shown in the example of FIG. 4, the fluid flow sensor 30 is provided on the inside or concave side of the bow spring 20 in order to avoid contact with a bore hole wall 44, in use, which could damage the fluid flow sensor 30. The housing 42 is provided with an electrical connection 45 which may be used to provide electrical power to the signal processing electronics and also to provide a digital output from the fluid flow sensor 30.

Figure 5:
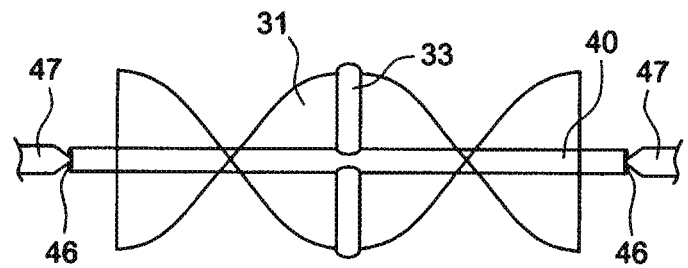
FIG. 5 shows an example of the mounting of the magnet to the turbine in accordance with an embodiment of the present invention.

FIG. 5 shows an example of the mounting of the magnet 33 shown in FIG. 4 to the turbine 31 and shaft 40. The magnet 33 is provided in a cylindrical cavity provided in the turbine 31 and through the shaft 40. The magnet 33 may assist the securing of the turbine 31 to the shaft 40 and provide an easily balanced arrangement making the sensor 30 very sensitive and precise. The shaft 40 may have concave bearings 46 for convenient mounting to pivots 47 provided on the mounts 41.

Figure 6:
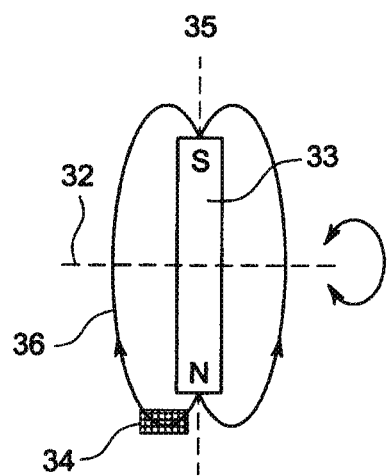
FIG. 6 schematically shows magnetic flux lines in accordance with an embodiment of the present invention.

FIG. 6 shows the magnetic flux lines 36 from the magnet 33 impinging on the magnetic flux angle sensor 34 at one position during the rotation of the turbine 31 and magnet 33 around the axis 32. As can be seen, the magnet 33 rotates about the axis 32 in a plane 35 and the magnetic flux angle sensor 34 is offset from this plane of rotation 35 in order to resolve the direction of magnetic flux. Resolving the direction of magnetic flux 36 provides information regarding the direction of rotation of the magnet 33 and turbine 31 and thus also the direction of flow of fluid past the fluid flow sensor 30. Knowing the direction of flow is very useful in downhole wells in which fluids can flow in either or both directions.

Figure 7:
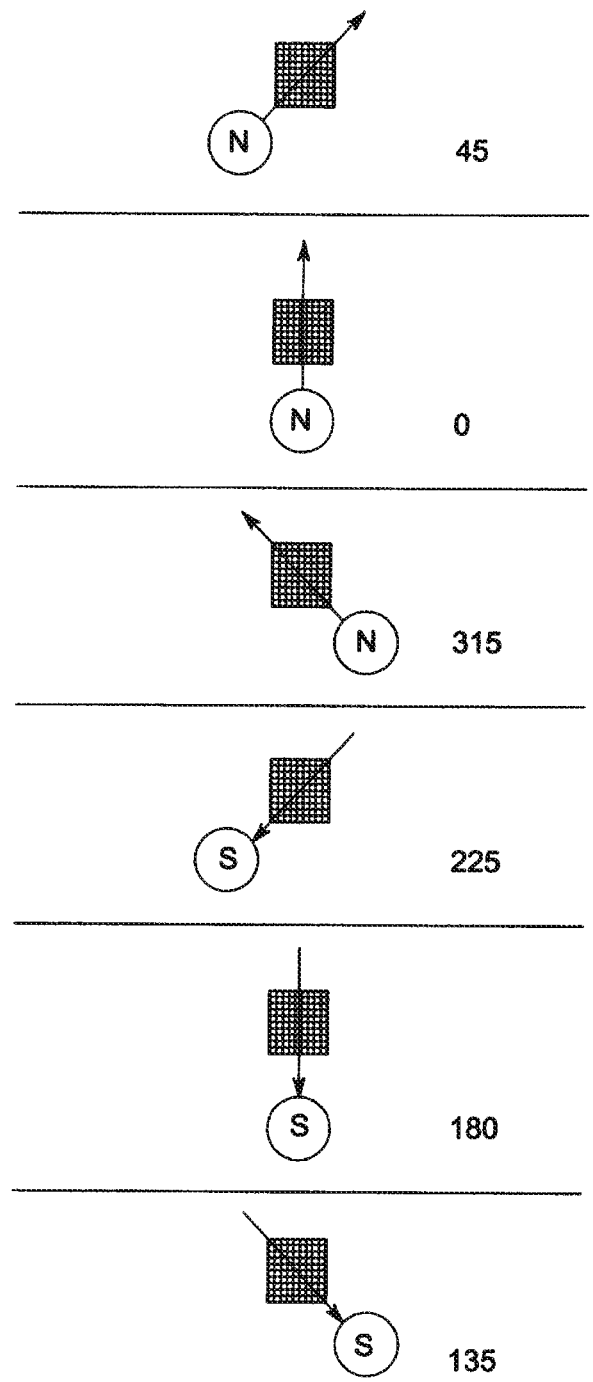
FIG. 7 shows the magnetic field experienced by a flux angle sensor at various stages of rotation of a turbine in accordance with an embodiment of the present invention.

FIG. 7 schematically shows a plan view at various stages of rotation of the magnet 33 and turbine 31. The magnetic flux angle sensor 34 is fixed and the magnet 33 on the rotating turbine 31 sweeps past one side of the magnetic flux angle sensor 34 yielding the flux angles listed down the right hand side of FIG. 7. Although flux lines emerge radially in all directions from the magnet, only the flux line passing through the magnetic flux angle sensor 34 is shown at each stage of FIG. 7. These flux angle signals measured by the flux angle sensor 34 are then used to determine the speed and direction of rotation using signal processing electronics described in FIG. 9.

Figure 8:
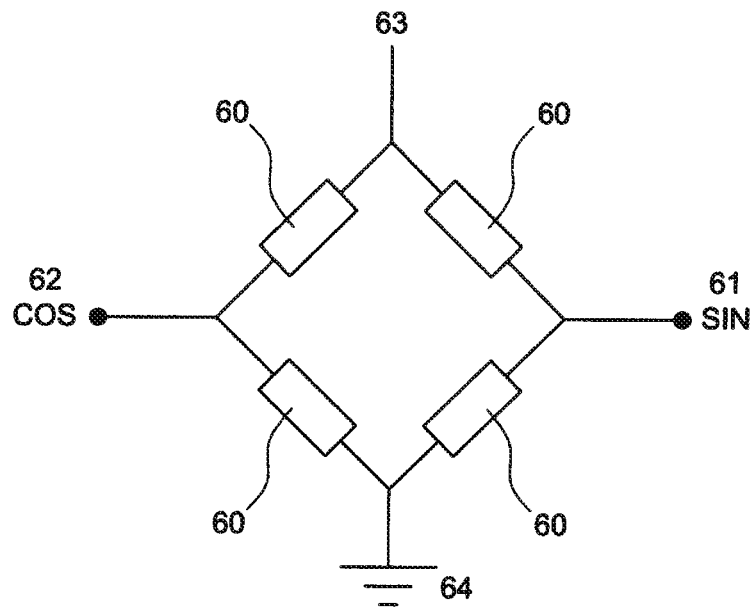
FIG. 8 shows an example of a magnetic flux angle sensor in accordance with an embodiment of the present invention.

FIG. 8 diagrammatically shows the internal arrangement of the magnetic flux angle sensor 34 comprising, in this example, a bridge of four magneto-resistive elements 60 arranged so as to provide sine and cosine outputs 61, 62 related to the flux angle experienced by the flux angle sensor 34. As shown in FIG. 8, the bridge arrangement is provided between a supply voltage 63 and an earth connection 64. Magnetic flux angle sensors 34 are available commercially, for example from NVE Corporation of the USA.

Figure 9:
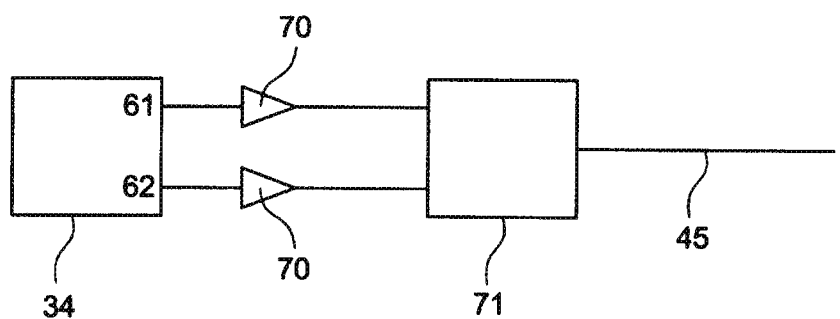
FIG. 9 schematically shows an example of a controlling electronic circuit that may be associated with a magnetic flux angle sensor in accordance with an embodiment of the present invention.

FIG. 9 illustrates the magnetic flux angle sensor 34 provided with a signal processing circuit to provide an output indicative of fluid flow past the fluid flow sensor 30. In this example the sine 61 and cosine 62 outputs from the magnetic flux angle sensor 34 are each passed through an amplifier 70 and received by a controller 71 such as a micro controller. The controller 71 processes the amplified sine and cosine signals and provides an output on the connector 45 indicative of the direction and speed of fluid passing the sensor 30. The output on connector 45 may, for example, be stored or passed to the surface for interpretation and analysis. In this example the connector 45, which may be a single electrical wire with a surrounding grounded sheath, both provides electrical power to the signal processing electronics and also provides a digital output for storage/interpretation and analysis.

Many variations may be made to the examples described above whilst still falling within the scope of the present invention. For example, instead of a single magnet 33 as shown in FIGS. 2 and 4, a plurality of magnets may be provided around the periphery of the turbine 31 with alternating North and South poles. Although one particular turbine shape is illustrated, any suitable turbine may be used as will be appreciated by a person skilled in the art.

What is claimed is:

1. A bi-directional fluid flow sensor, the sensor comprising
    a turbine configured to rotate along an axis as a result of fluid flowing past the turbine;
    a magnet mounted to the turbine and configured to rotate with the turbine; and
    a magnetic flux angle sensor provided adjacent to the turbine and configured to detect the relative flux angle of the magnet as it rotates.

2. The fluid flow sensor of claim 1, comprising a plurality of magnets provided circumferentially around the rotational axis of the turbine.

3. The fluid flow sensor of claim 1, wherein the magnetic flux angle sensor is mounted offset from the plane of rotation of the magnet.

4. The fluid flow sensor of claim 1, wherein the magnetic flux angle sensor is configured to provide signals corresponding to the sine and cosine of the detected magnetic signal.

5. The fluid flow sensor of claim 1, wherein the magnetic flux angle sensor comprises a controller, the controller comprising an electrical connection configured to provide electrical power to the controller and also configured to provide a digital output from the controller.

6. The fluid flow sensor of claim 1, wherein the magnet is provided through the rotational axis of the turbine.

7. The fluid flow sensor of claim 6, wherein the polar axis of the magnet is perpendicular to the rotational axis of the turbine.

8. An array flow meter tool for a downhole well, the tool comprising a plurality of resilient radially outwardly extending bow springs each provided with a fluid flow sensor, wherein the fluid flow sensor comprises:
    a turbine configured to rotate along an axis as a result of fluid flowing past the turbine;
    a magnet mounted to the turbine and configured to rotate with the turbine; and
    a magnetic flux angle sensor provided adjacent to the turbine and configured to detect the relative flux angle of the magnet as it rotates.

9. The array flow meter tool of claim 8, comprising a plurality of magnets provided circumferentially around the rotational axis of the turbine.

10. The array flow meter tool of claim 8, wherein the magnetic flux angle sensor is mounted offset from the plane of rotation of the magnet.

11. The fluid flow sensor of claim 8, wherein the magnetic flux angle sensor is configured to provide signals corresponding to the sine and cosine of the detected magnetic signal.

12. The fluid flow sensor of claim 8, wherein the magnetic flux angle sensor comprises a controller, the controller comprising an electrical connection configured to provide electrical power to the controller and also configured to provide a digital output from the controller.

13. The array flow meter tool of claim 8, wherein the magnet is provided through the rotational axis of the turbine.

14. The array flow meter tool of claim 13, wherein the polar axis of the magnet is perpendicular to the rotational axis of the turbine.

\* \* \* \* \*